United States Patent
Tanner

(10) Patent No.: US 10,759,608 B2
(45) Date of Patent: Sep. 1, 2020

(54) SEPARATING APPARATUS FOR SEPARATING CROSSED HOOKS

(71) Applicant: FERAG AG, Hinwil (CH)

(72) Inventor: Roland Tanner, Wernetshausen (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/273,801

(22) Filed: Feb. 12, 2019

(65) Prior Publication Data
US 2019/0248594 A1 Aug. 15, 2019

(30) Foreign Application Priority Data
Feb. 15, 2018 (CH) .......................... 184/18

(51) Int. Cl.
| *B65G 33/02* | (2006.01) |
| *B65G 47/28* | (2006.01) |
| *B65G 33/30* | (2006.01) |

(52) U.S. Cl.
CPC .............. *B65G 33/02* (2013.01); *B65G 33/30* (2013.01); *B65G 47/28* (2013.01); *B65G 2201/0229* (2013.01)

(58) Field of Classification Search
CPC ......... B65G 33/02; B65G 33/30; B65G 47/28
USPC ............................................. 198/459.3, 459.4
See application file for complete search history.

(56) References Cited

U.S. PATENT DOCUMENTS 5,305,896 A    4/1994  Branch
5,788,054 A *  8/1998  Janzen .................... B65G 33/02
                                                        198/459.3

FOREIGN PATENT DOCUMENTS

| DE | 8802172 U1 | 5/1988 |
| DE | 9217954 U1 | 5/1993 |
| DE | 29505986 U1 | 6/1995 |
| DE | 195 14 604 A1 | 10/1996 |
| DE | 10 2016 111 955 A1 | 1/2018 |
| EP | 0 346 991 A1 | 12/1989 |
| EP | 0 738 672 A1 | 10/1996 |
| JP | S62-235120 | 10/1987 |
| WO | WO 03/037758 A1 | 5/2003 |

OTHER PUBLICATIONS

European Patent Office, EPA Form 1507N and EPO Form 1503 03.82, European Search Report for European Patent Application No. EP 19 15 5370 (8 pages).

* cited by examiner

*Primary Examiner* — Gene O Crawford
*Assistant Examiner* — Lester Ill Rushin
(74) *Attorney, Agent, or Firm* — Pauley Erickson & Kottis

(57) ABSTRACT

A separating apparatus (10) for separating crossed hooks (21*a-d*) of overhead conveyor units (2*a-d*) includes a conveying cylinder (1) having a recess (11) which forms a helical thread (12) with helix base (121) and helix flanks (122, 123) for the conveyance of the hooks (21*a-d*). The conveying cylinder (1) includes at least, one wing-shaped separating element (13), which extends over a partial circumference of the conveying cylinder (1) and protrudes in the radial direction from the peripheral surface of the conveying cylinder (1), wherein the separating element (13), by rotation of the conveying cylinder (1), is insertable between two hooks (21*a-d*) resting on the conveying cylinder (1).

22 Claims, 5 Drawing Sheets

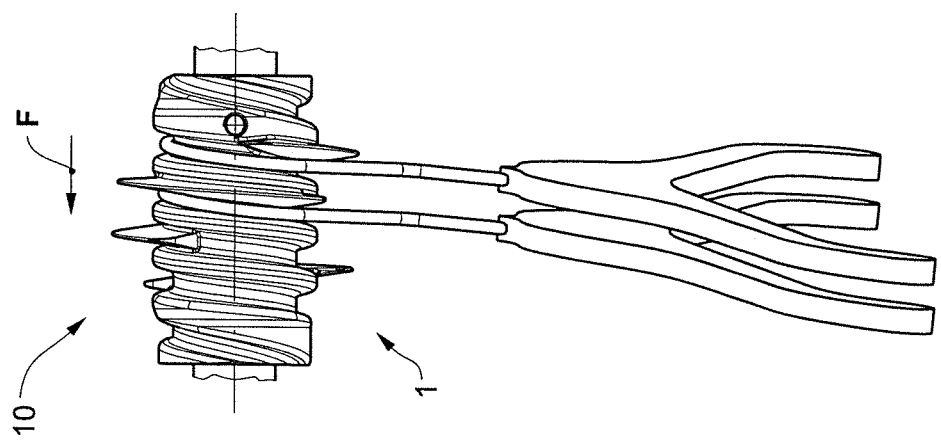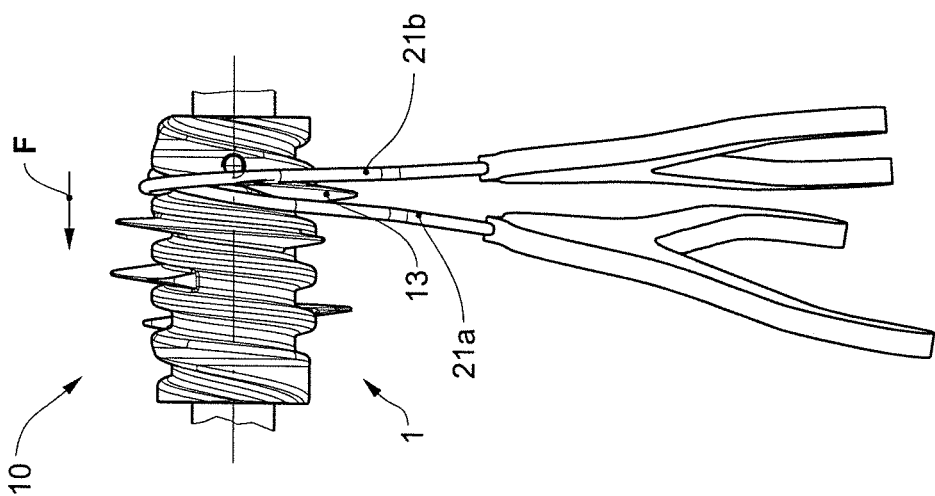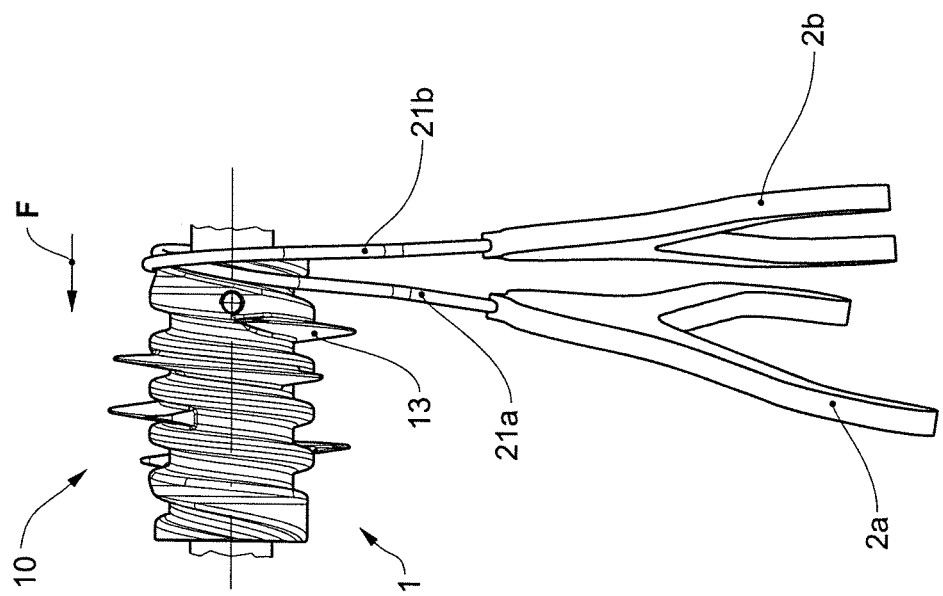

SEPARATING APPARATUS FOR SEPARATING CROSSED HOOKS

CROSS-REFERENCE TO RELATED APPLICATIONS

Swiss Patent Application 00184/18, filed 15 Feb. 2018, the priority document corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to a separating apparatus for separating crossed hooks of overhead conveyor units and to a conveyor having a separating apparatus.

Discussion of Related Art

In intralogistics, goods, depending on type and the intralogistical requirements, are conveyed with various conveyor units and conveyors. In overhead conveyors, overhead conveyor units which have hooks and are conveyed with these in the overhead conveyor are here a possible option for the conveyance of the goods.

In particular in the clothing industry, such as, for example, in collection warehouses, dispatch warehouses, or even in dry cleaners, overhead conveyors having overhead conveyor units conveyed via hooks are employed, wherein the overhead conveyor units are typically clothes hangers. The hooks of the clothes hangers here provide a releasable coupling between the clothes hangers and the overhead conveyor.

Generally, a singularization or singularized conveyance of a plurality of overhead conveyor units with hooks is desirable, for example for sorting operations. A known problem is here presented by crossed hooks, which complicate or prevent a singularization or singularized conveyance. From the prior art, various proposals for separating such crossed hooks are known.

DE 9217954 describes a hanger singularizing apparatus with which hooked-together hangers can be singularized. The hanger singularizing device has beneath a rotating, inclined rod two guide rails arranged parallel to the rod, which are arranged in such a way at a lateral distance apart that they form directly beneath the rod a narrow guide slot lying axially parallel to the rod. In this slot slide the hook shanks of the hanger hooks, whilst the hanger aims are located beneath the guide rails and the hanger hooks sit on the rod. The hanger singularizing device has, moreover, at least two pointed, needle-shaped separating fingers, which are positioned at a specific distance apart in the direction of transport and which are mounted such that they are extensible and retractable with drive means. Arranged after the separating finger, at a distance therefrom, is also a stopper finger, which is likewise mounted such that it can be advanced and withdrawn with drive means. Moreover, the rod bears a radially outwardly extending separating blade bar, which is positioned shortly behind the separating finger in the direction of transport and the flat plane of which is oriented perpendicular to the rotational axis of the rod. The hangers slide downwards on the rotating, inclined rod by force of gravity, wherein the hanger shank of the foremost hanger of a series of hangers butts against the advanced first separating finger and the following hangers are stacked. The second separating finger is then withdrawn and the stopper finger advanced. After this, the first finger is withdrawn and the second finger advanced, whereupon the foremost hanger shank butts against the second separating finger. Subsequently, the first separating finger is advanced again and slips behind the hanger shank of the foremost hanger. The distance between the separating fingers is so small that only one hanger hook shank fits there between. Shortly afterwards, the second separating finger is withdrawn and, at the same time, the separating blade bar is rotated into the gap between the foremost hanger hook shank and the following hanger hook shank. If these hanger hooks are not hooked together, the foremost hanger readily slides against the advanced stopper finger. If the hanger hooks are hooked together, the separating blade bar drives or wedges the hanger hooks apart, so that then the foremost hanger can slide freely, by force of gravity, to the stopper finger.

DE 19514604 A1 describes an apparatus for singularizing mutually crossed hooks of an article to be conveyed which is transported in hanging position on hangers or the like, wherein the hooks embrace a rotating, substantially cylindrical, at least partially hollow body in the form of a spindle and are transported by this same, and the body has a radially outwardly pointing singularizing device reaching between two hooks. The singularizing device consists of a plurality of parallelly arranged pins, which are spring-mounted inside the body and jut out of the body via elongated holes. The pins are fastened to an axially displaceably mounted, rotatable shaft within the hollow body, wherein, in particular, each pin is fastened to a separate shaft. Two hanger hooks transported with the spindle make their way into the threads of the spindle, wherein individual hangers are transported freely past the pins. Cross-hanging hangers are taken up by a first pin, in that the latter moves with its tip in between the two hanger hooks and raises the upper hook and exposes it. As soon as the hanger hooks are singularized, they run freely past the following pins. If a hook directly meets a tip of a pin and threatens to tilt it, the pin, by virtue of the spring-mounting of its shaft, yields to the pressure, and the hook slides past the tip. In order to avoid excessive swivel movements of the hanger, the spindle is surrounded by a housing which, in the lower region, leaves free an appropriate guide gap. Swinging hangers are then steadied by the gap.

DE 102016111955 A1 describes a hanger separating apparatus for separating hangers present on a separating rod which have crossed. The hanger separating apparatus comprises a separating rod, a multiplicity of mutually spaced separating blades, which are fastened substantially in a line along the longitudinal axis of the separating rod and point outwards, a drive, which is designed to rotate the separating rod, by means of the drive, about its longitudinal axis, and a conveyor for transporting a multiplicity of hangers arranged side by side. The conveyor comprises a driver apparatus which is guided in a circle and has a height-adjustable driver or a multiplicity of side-by-side height-adjustable drivers in order, on the one hand, to ensure a secure transport of the multiplicity of hangers in the lowered position and, on the other hand, in the raised position, not to impede the meshing of the separating blades during the separating operation. In order to securely grip the hangers during the transport operation, the driver, or the multiplicity of side-by-side drivers, has/have mutually adjacent teeth. In a conveying position of the hanger separating apparatus, the drivers are in a lowered position, and the separating blades point obliquely downwards into the inside of the hanger separating apparatus in order to prevent the separating blades from interacting with the hangers. In a basic position for the separating operation, the drivers are lifted upwards by means of a lifting bar. Following ending of the separating operation, the drivers are lowered back onto the separating rod by means of a lowering bar. The circularly rotating drivers reach with their teeth between the hooks of the hangers and convey the hangers onwards. The separating blade comprises a fastening base, and a tip which reaches between the hangers.

SUMMARY OF THE INVENTION

In the singularization of hooks of overhead conveyor units, it is desirable to minimize errors in the conveyance of the goods and to ensure a highest possible conveying capacity. The singularization should therefore, on the one hand, be controlled as far as possible and, on the other hand, proceed as efficiently as possible.

It is therefore an object of the invention to at least improve the prior art for singularizing hooks of overhead conveyor units, in particular for separating crossed hooks.

This object is achieved, in part, by features of the independent claim. Advantageous embodiments of the invention are given in the dependent claims and in the present description and the figures.

The invention relates to a separating apparatus for separating crossed hooks of overhead conveyor units, comprising a conveying cylinder having a recess which forms a helical thread with helix base and helix flanks for the conveyance of the hooks. The conveying cylinder comprises at least one wing-shaped separating element, which extends over a partial circumference of the conveying cylinder and protrudes in the radial direction from the peripheral surface of the conveying cylinder, wherein the separating element, by rotation of the conveying cylinder, is insertable between two hooks resting on the conveying cylinder.

For the conveyance of the overhead conveyor units, the hooks respectively rest on the conveying cylinder via a support point, for example on the helix base. By virtue of the conveying cylinder having the recess that forms a helical thread, a controlled conveyance of the overhead conveyor units is enabled. The conveying speed can be varied via the rotational velocity of the conveying cylinder and via the slope of the helical thread.

Preferably, the overhead conveyor units are singularized in such a way by means of the conveying cylinder that the hooks of the overhead conveyor units assume in the direction of conveyance a defined distance apart, which preferably corresponds to the pitch of the helical thread. In the conveyance by means of the conveying cylinder, it can often occur, however, that two or more hooks of overhead conveyor units rest in crossed arrangement on the conveying cylinder, and therefore, for the singularization, a separation of these same is necessary. The new separating element offers the advantage of an automated and controlled separation of such crossed hooks of overhead conveyor units.

By virtue of the wing-like shape of the separating element and the extension over a partial circumference of the conveying cylinder, during the separating operation a guide can be provided for the hooks, so that a controlled separation of the crossed hooks is aided. The rotation of the conveying cylinders does here generally not have to be interrupted or changed, since the separating element is inserted between the crossed hooks by the rotation movement of the conveying cylinder and separates these with the further rotation of the conveying cylinder. The separating apparatus therefore offers the advantage that the hooks can be continuously conveyed by the helically threaded conveying cylinder, wherein the separating operation of crossed hooks can proceed without major impairment or interruption of the conveyance of the hooks. The separating elements are advantageously configured such that the conveyance of the hooks, in particular of the uncrossed hooks, is not or only minimally impaired by the separating elements, wherein the separating elements advantageously, by virtue of the shape and arrangement, enable an additional guidance of the hooks in the helical thread.

The separating apparatus further offers numerous possibilities for the specific adjustment of the separating operation by simple adaptation of the geometry, arrangement, number, etc. of the wing-shaped separating elements, whilst ensuring a controlled separation of the crossed hooks. In particular, undesirable movements of the hooks in the separating operation, such as, for example, swivel movements, can be reduced without impairing the separating efficiency and conveying capacity. By the adaptation of the separating elements, the different behaviour of various hook shapes can further be taken into account.

A particularly advantageous application of the invention is to be found in the clothing industry, where the overhead conveyor units comprise clothes hangers which rest with hooks on the conveying cylinder. The overhead conveyor units can, however, also comprise bags, containers, clamps, plates, baskets, or the like.

The partial circumference over which the separating element extends is in some embodiments greater than or equal to one-eighth, one-sixth, one-quarter or one-third of the circumference of the conveying cylinder.

Generally, the partial circumference over which the separating element extends is smaller than a full turn of the helical thread of the conveying cylinder. Through the choice of a specific partial circumference over which the separating element extends, the characteristics of the separating operation, for example the distance which the crossed hooks cover during the separation along the separating elements, can be adjusted.

In one embodiment, the separating element has an inclination in the azimuthal direction.

Preferably, the azimuthal direction corresponds to a direction of rotation of the conveying cylinder. As a result of the inclination of the separating element in the azimuthal direction, the separating element can form a partial helical thread. Advantageously, the separating element can thereby during the separating operation push hooks in the direction of conveyance or aid the conveyance of the hooks. In particular, the separating operation can be embedded in such a way in the conveying operation of the hooks that abrupt changes in movement of the hooks can be reduced or prevented.

In one embodiment, the inclination of the separating element matches a slope of the helical thread at the separating element.

In one embodiment, the inclination of the separating element can be lesser or greater than a slope of the helical thread at the separating element.

Within the context of the present invention, "at the separating element" means that the relevant feature of the helical thread, such as, for example, the slope, is viewed at a position of the conveying cylinder which is generally distanced by one or two full turns from the separating element.

By an adaptation of the inclination of the separating element in the azimuthal direction, the controlled separating operation can be improved and/or the separating effect enhanced. In the case of a plurality of separating elements, one or more of the separating elements can have an inclination matching a slope of the helical thread at the separating element, and/or one or more separating elements have an inclination different from the slope of the helical thread. The inclinations of at least two separating elements can therefore in some embodiments differ. The separating element offers the advantage of being able to tune the separating operation to the respective requirements by varying the inclination in relation to the slope of the helical thread.

In one embodiment, the separating element is arranged on a helix flank.

In the case of crossed hooks, in particular when the width of the helix base along the longitudinal axis of the conveying cylinder is in the order of magnitude of the diameter of the hooks, frequently one of the hooks, due to the crossover, does not rest on the helix base, but bears at least partially against a helix flank. In particular in such configurations, a separating element arranged on a helix flank can actively engage between crossed hooks and separate these from one another. Moreover, the arrangement on a helix flank offers the advantage that, for separated hooks, there exists in the helix base space in which a separated hook can rest and be conveyed onwards in a controlled manner. Furthermore, a separating element arranged on a helix flank can particularly aid the conveyance of the hooks.

The separating element can be arranged on a, in relation to the direction of conveyance of the conveying cylinder, front helix flank or rear helix flank.

In one embodiment, the separating element is arranged on the helix base.

Given a helix base which is sufficiently wide along the longitudinal axis of the conveying cylinder, an arrangement on the helix base can offer the advantage that the engagement of the separating elements between crossed hooks is simplified.

In one embodiment, the separating element extends from the helix base to a helix flank.

This can be achieved by an inclination of the separating element that differs from the slope of the helical thread, and an extension over a sufficient partial circumference of the conveying cylinder.

In embodiments having a plurality of separating elements, one or more separating elements can be arranged on a helix flank and/or one or more separating elements on the helix base, and/or one or more separating elements extend from the helix base to a helix flank.

In one embodiment, the separating element has a profile which tapers in an azimuthal direction, which azimuthal direction preferably corresponds to a direction of rotation of the conveying cylinder.

With respect to the taper in the azimuthal direction, the person skilled in the art understands that an inclination of the separating element in the azimuthal direction is correspondingly included.

In particular, the separating element can taper off in the direction of rotation, which improves the insertability between crossed hooks. Counter to the direction of rotation, the profile advantageously widens, so that the separating element, following insertion between crossed hooks, can spatially separate these with increasing rotation of the conveying cylinder.

Alternatively or additionally, the separating element has a profile which tapers away from the peripheral surface of the conveying cylinder in the radial direction.

The separating element can therefore taper off in the radial direction, which improves the insertability between crossed hooks.

In one embodiment, the separating element has an edge which extends out from the peripheral surface of the conveying cylinder and is oriented towards the direction of rotation of the conveying cylinder, and which forms an angle with a radial axis of the conveying cylinder. The separating element can hence form a tip which is insertable between two hooks.

In one embodiment, the separating element protrudes in the radial direction from the peripheral surface of the conveying cylinder with a height which varies over the partial circumference, wherein preferably the height of the separating element decreases in an azimuthal direction which corresponds to a direction of rotation of the conveying cylinder.

With a varying height of the separating element, the course of the separating operation can be adapted in much the same way as in the tapered profiles. For example, a height of the separating element that increases counter to the direction of rotation of the conveying cylinder can have the effect of enabling a continuous insertion and increasing spatial separation of the crossed hooks, so that abrupt movements can be reduced or avoided.

In some embodiments, the conveying cylinder has at least two, three, four, six or eight separating elements.

A plurality of successive separating elements offer the advantage that crossed hooks can pass through a plurality of separating elements and, in the event of unachieved separation by one separating element, the separation can be performed by a following separating element. This is particularly advantageous in the case of a large number of successive crossed hooks. Also where there are more than two crossed hooks, a plurality of separating elements are of advantage, since, for example, in the case of the first separating element, out of a group of crossed hooks one hook can be separated, in the case of the next separating element, out of the group, one further hook can be separated, etc. It is also conceivable that, in the case of one separating element, a group of hooks is divided, and the downstream-situated part of the divided group is further divided with the directly following separating element. The upstream-situated part of the group can pass again over the same separating element and be divided by this same.

Preferably, the separating elements are arranged offset along the longitudinal axis of the conveying cylinder, preferably spaced apart by less than one full turn of the helical thread.

Alternatively or additionally, the, or some of the, separating elements can be arranged spaced apart by more than one full turn of the helical thread. For example, initially some separating elements can be arranged spaced apart by less than one full turn of the helical thread in order that crossed hooks can pass through these separating elements in quick succession. Following on from these separating elements, further separating elements can then be arranged spaced apart by more than one full turn in order to separate the remaining non-separated hooks one from another. This can be advantageous insofar as, in the separating operations, in particular in separating operations proceeding in quick succession, swivel movements of the hooks can be generated. These swivel movements can subside through a portion of the conveying cylinder that is without separating elements, so that a further controlled separation of remaining crossed hooks is facilitated.

In one embodiment, the separating elements are arranged azimuthally offset.

Through the azimuthally offset arrangement of the separating elements, the sequence of successive separating operations, in particular, the sequence of insertions of the separating elements between crossed hooks, can be coordinated in relation to the rotation of the conveying cylinder. An optimal azimuthal offsetting of the separating elements can be chosen, moreover, in relation to generated swivel movements of the hooks.

In specific embodiments, the separating elements are arranged azimuthally offset by 180°, 120°, 90°, 60° or by 45°.

In one embodiment, the separating elements are configured such that at least two separating elements extend over differently sized partial circumferences of the peripheral surface of the conveying cylinder.

Through the choice of a specific partial circumference over which the separating element extends, the characteristics of the separating operation, for example the distance which the crossed hooks cover along the separating element during the separating operation, can be adjusted. For example, successive separating elements can extend in the direction of conveyance over increasing partial circumferences of the peripheral surface of the conveying cylinder, so that the distance which the crossed hooks cover along the separating element during the separating operation increases with the separating elements. Advantageously, the separating efficiency along successive separating elements can thereby be increased.

Alternatively, the partial circumferences of successive separating elements can decrease in the direction of conveyance. For example, it can hence be achieved that, in a group of a plurality of crossed hooks, in the case of the first separating element, a first main separation is realized, and the separated parts of the group with crossed hooks can be further divided in successive separating elements having smaller partial circumferences.

In one embodiment, the distance between two adjacent separating elements differs from the pitch of the helical thread in the region of the separating elements.

For example, this can be achieved by the arrangement of one separating element on a front helix flank in relation to the direction of conveyance, and an adjacent separating element on a rear helix flank. It is also possible for this to be achieved by the arrangement of one separating element on the helix base, and an adjacent separating element on a helix flank. A different spacing can also be achieved by an inclination of the separating elements which differs from the slope of the helical thread.

Within the context of the present invention, "in the region of the separating elements" means that the relevant feature of the helical thread, such as, for example, the pitch, is viewed at a position of the conveying cylinder which is generally distanced by one or two full turns from the relevant separating elements.

In one embodiment, at least two separating elements have different inclinations.

In one embodiment, the separating elements are respectively arranged on a helix flank or on the helix base, wherein the arrangement of at least two separating elements is different.

In one embodiment, the heights with which the separating elements protrude in the radial direction from the peripheral surface of the conveying cylinder differ between at least two separating elements.

In one embodiment, the separating apparatus has a guide apparatus, which is arranged on the conveying cylinder such that the guide apparatus limits a radial and/or azimuthal movement of the hooks, and the guide apparatus is preferably configured to push the hooks in the axial direction.

As a result of the guide apparatus, the controlled separation and conveyance of the hooks can be improved. Undesirable movements such as swivel or jumping movements can be resisted. A further advantage is that hooks which have been repelled by a separating element, for example due to a failed separation, or a, in relation to the direction of conveyance, rear hook following an achieved separation, can be pushed again in the direction of the separating element. The guide apparatus can therefore, in particular in the region of the separating elements, aid the pushing of the hooks in the direction of conveyance through the helical thread.

In one embodiment, the guide apparatus is configured as a brushing worm arranged parallel to the conveying cylinder, wherein the brushing worm can be brought into engagement with hooks resting on the conveying cylinder.

In one embodiment, the guide apparatus comprises at least one rail, which is arranged parallel to the conveying cylinder. Preferably, the guide apparatus comprises two rails, which are arranged parallel to the conveying cylinder and between which the hooks can be guided.

In one embodiment, on the conveying cylinder, downstream of the at least one separating element, is arranged a sensor, which is configured to detect singularized hooks.

By the sensor, the separating efficiency of the separating elements can be monitored. The sensor is in some embodiments configured as an optical sensor or an inductive sensor.

In one embodiment, the conveying cylinder has two or more helical threads. Each of the helical threads can here have at least one separating element according to the present description. The helical threads can have mutually different slopes.

The invention further relates to a conveyor having a separating apparatus according to the present description.

Preferably, the conveyor is an overhead conveyor.

In one embodiment, the conveyor comprises a control system which controls the separation of the crossed hooks with the separating apparatus, wherein the control system is preferably connected to a sensor, arranged downstream of the at least one separating element, for detecting singularized hooks, and controls the conveying speed of the conveying cylinder in dependence on the detection of hooks by the sensor.

In the case of a high separating efficiency, i.e. when the sensor detects solely singularized hooks or a tolerable number of non-singularized hooks, the control system can increase the conveying speed by increasing the rotational velocity of the conveying cylinder. In the case of a low separating efficiency, i.e. when the sensor detects too many non-singularized hooks, the control system can reduce the conveying speed accordingly.

BRIEF DESCRIPTION OF SEVERAL VIEWS OF THE DRAWINGS

Embodiments of the invention are explained in greater detail on the basis of the following figures and the associated description, wherein:

FIG. 3*a* shows one side view of a detail of the separating apparatus from FIG. 1 comprising the conveying cylinder, during a separating operation;

FIG. 3b shows another side view of a detail of the separating apparatus from FIG. 1 comprising the conveying cylinder, during a separating operation;

FIG. 3c shows yet another side view of a detail of the separating apparatus from FIG. 1 comprising the conveying cylinder, during a separating operation;

DESCRIPTION OF PREFERRED EMBODIMENTS

In order to illustrate the invention, preferred embodiments are described in greater detail with reference to the figures.

Figure 1:
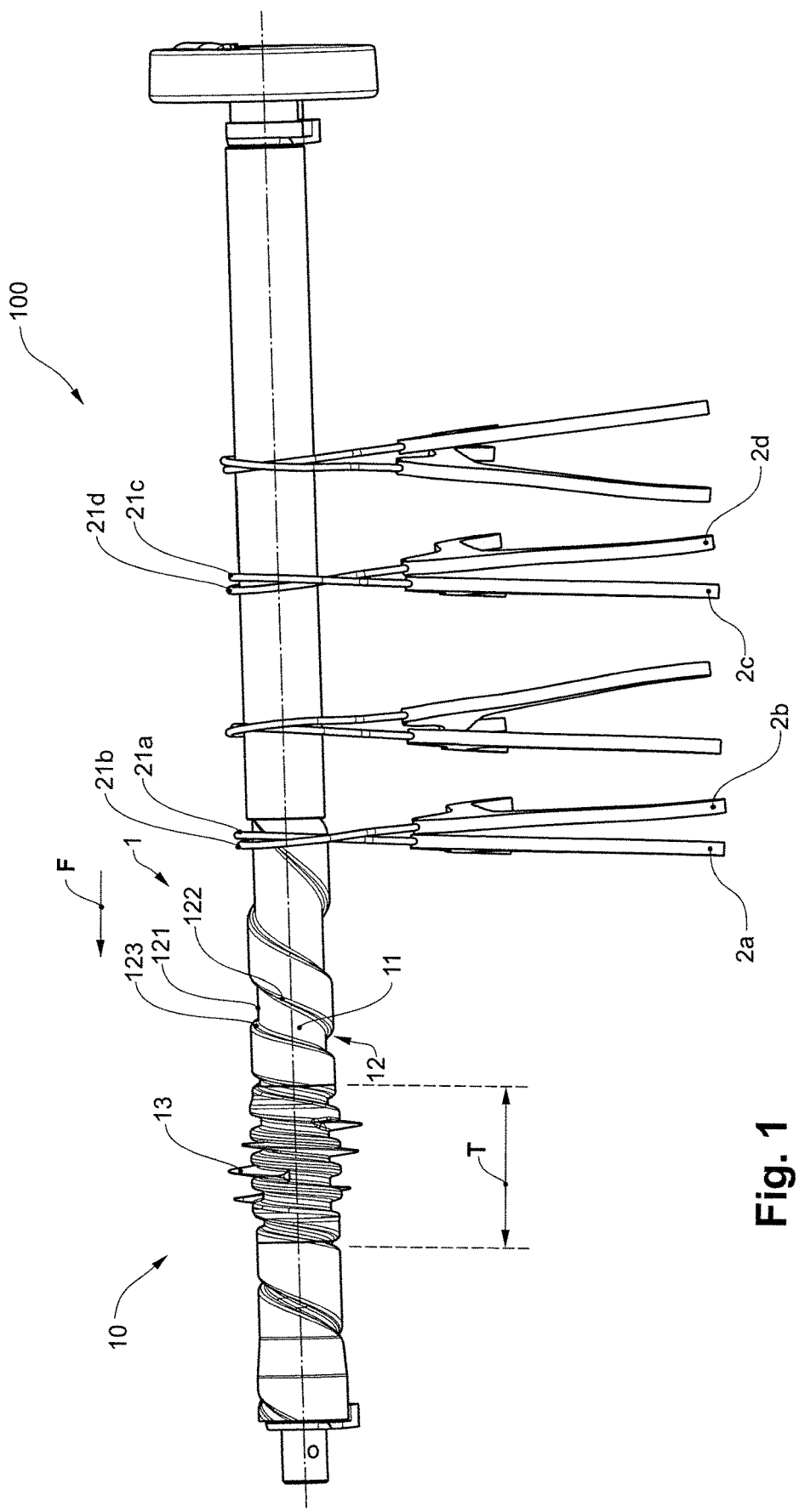
FIG. 1 shows a side view of one embodiment of a conveyor having a separating apparatus.

FIG. 1 shows a side view of an embodiment of a conveyor 100 in the form of an overhead conveyor having a separating apparatus 10. The separating apparatus 10 comprises a conveying cylinder 1 having a recess 11, which latter forms a helical thread 12 having a helix base 121, a, in relation to the direction of conveyance F, rear helix flank 122 and a, in relation to the direction of conveyance F, front helix flank 123. By rotation of the conveying cylinder 1, hooks resting in the helical thread 12 can be conveyed in the direction of conveyance F. In FIG. 1, two crossed hooks 21a, 21b of clothes hangers 2a, 2b are located in the helical thread 12 of the conveying cylinder 1. For the sake of greater clarity, the helical thread 12 is not displayed over the whole of the conveying cylinder 1, so that, following on from the hooks 21a, 21b, further crossed hooks (for example hooks 21c, 21d of clothes hangers 2c, 2d) are shown resting on a smoothly represented portion of the conveying cylinder 1. The conveying cylinder 1 comprises, in a separation region T, wing-shaped separating elements 13, which respectively extend over a partial circumference of the conveying cylinder 1 and protrude in the radial direction from the peripheral surface of the conveying cylinder 1. The slope of the helical thread 12 varies along the conveying cylinder 1, wherein the slope of the helical thread 12 in the separation region T, in comparison to the regions before and after it, is configured smaller in order to tune the conveying speed in the separation region and optimize the inclination and insertability of the separating elements in between the hooks. Similarly, it is evident that the helix base 121 varies along the conveying cylinder 1, wherein the width of the helix base 121 along the longitudinal axis of the conveying cylinder 1 is smaller in the separation region T than in the region before the separation region T. In the separation region T, the width of the helix base 121 is in the order of magnitude of the extension of the hooks 21a-d. In the case of the hooks 21a, 21b, the hook 21b of the rear clothes hanger 2b rests over the hook 21a of the front clothes hanger 2a. In the case of the hooks 21c, 21d, the crossover is the other way round, i.e. the hook 21c of the front hanger 2c rests over the hook 21d of the rear clothes hanger 2d. The separating apparatus 10 can separate the hooks irrespective of their order of crossover.

Figure 2A:
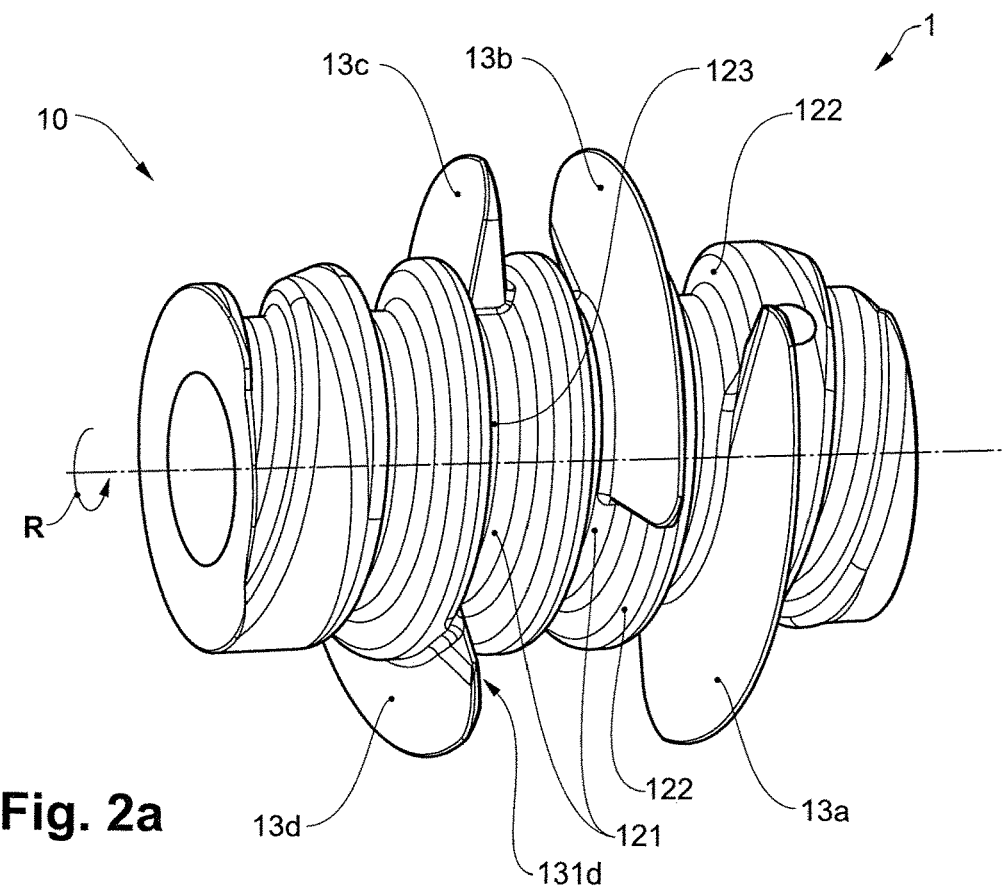
FIG. 2*a* shows one perspective view of a detail of the separating apparatus from FIG. 1.
Figure 2B:
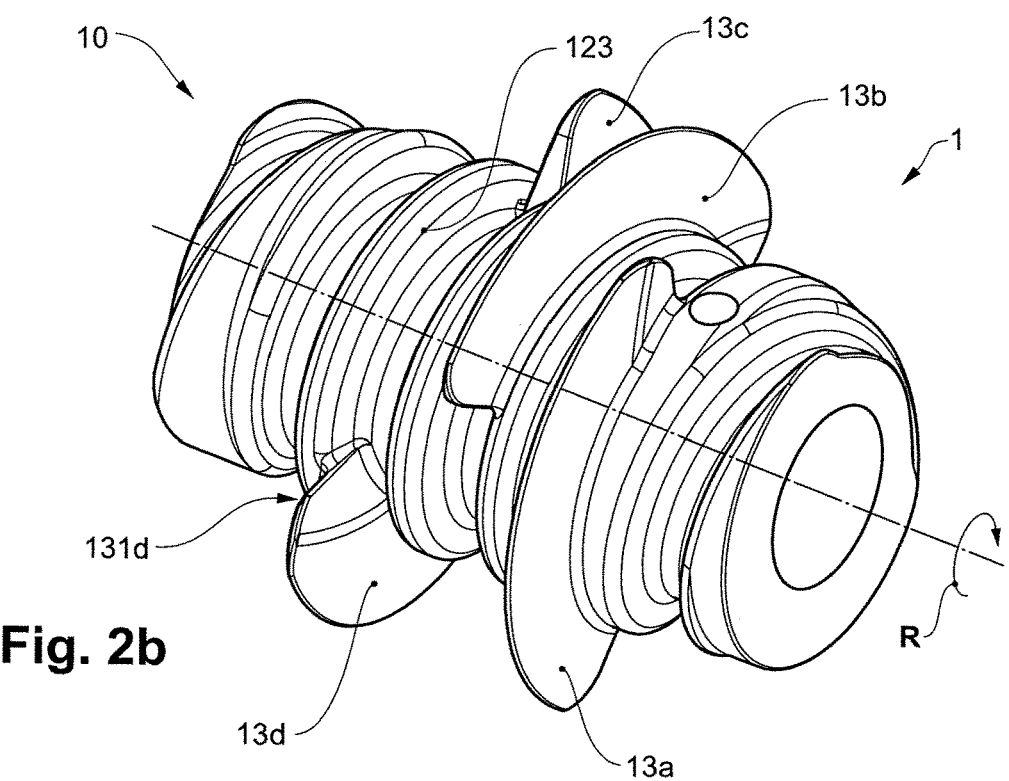
FIG. 2*b* shows another perspective view of a detail of the separating apparatus from FIG. 1.

FIG. 2a and FIG. 2b show various perspective views of a detail of the separating apparatus 10 from FIG. 1 in the separation region T. Shown are the wing-shaped separating elements 13a-d, which respectively extend over a partial circumference of the conveying cylinder 1. As can be seen particularly clearly from the separating element 13c, the separating elements 13a-d have a profile which tapers away from the peripheral surface of the conveying cylinder 1 in the radial direction. Furthermore, the separating elements 13a-d have a profile which tapers in the azimuthal direction, corresponding to the direction of rotation R of the conveying cylinder 1. By way of example, this can be seen in the separating element 13d, which has an edge 131d that tapers off in the direction of rotation R. The separating elements 13a-d have an inclination in the azimuthal direction and respectively form a partial helical thread. The separating elements 13a, 13b are arranged on the, in the direction of conveyance, rear helix flank 122. The separating element 13c is arranged on the helix base 121. The separating element 13d is arranged on the, in relation to the direction of conveyance, front helix flank 123.

FIGS. 3a-3c show side views of a detail of the separating apparatus 10 from FIG. 1 in the separation region T, with the conveying cylinder 1, during a separating operation. In FIG. 3a, the crossed hooks 21a, 21b are located before the separating element 13. In FIG. 3b, the conveying cylinder 1 has been further rotated such that the separating element 13 is inserted in between the hooks 21a, 21b. Finally, the conveying cylinder 1 rotates further until the hooks 21a, 21b are separated by the separating element 13 and can be conveyed onward with the conveying cylinder 1, in singularized arrangement, in the direction of conveyance F. This is shown in FIG. 3c.

Figure 4:
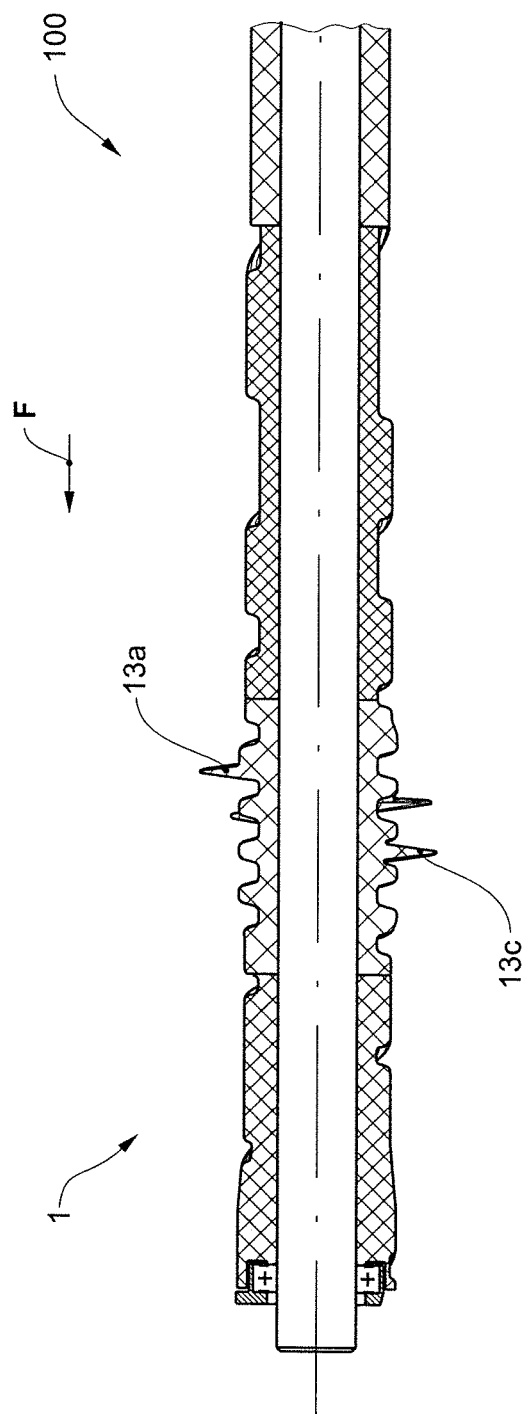
FIG. 4 shows a sectional view of the conveyor from FIG. 1.

FIG. 4 shows a sectional view of the conveyor 100 from FIG. 1 with the conveying cylinder 1. In the sectional view, it is apparent that the separating element 13a is arranged on a, in relation to the direction of conveyance F, rear helix flank. The separating element 13c is arranged on the helix base.

Figure 5:
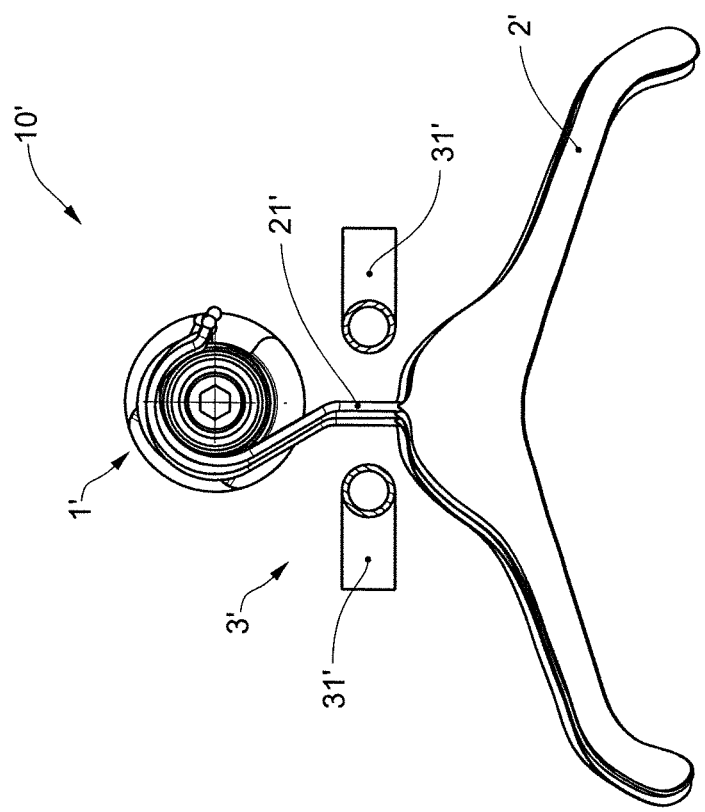
FIG. 5 shows a frontal view of an embodiment of a conveyor having a guide apparatus.

FIG. 5 shows a frontal view of an embodiment of a separating apparatus 10' having a guide apparatus 3'. The guide apparatus 3' comprises two rails 31', which are arranged beneath and parallel to the conveying cylinder 1'. The guide apparatus 3' restricts azimuthal movements of the hooks 21' such that swivel movements of the clothes hangers 2' can be reduced.

Figure 6:
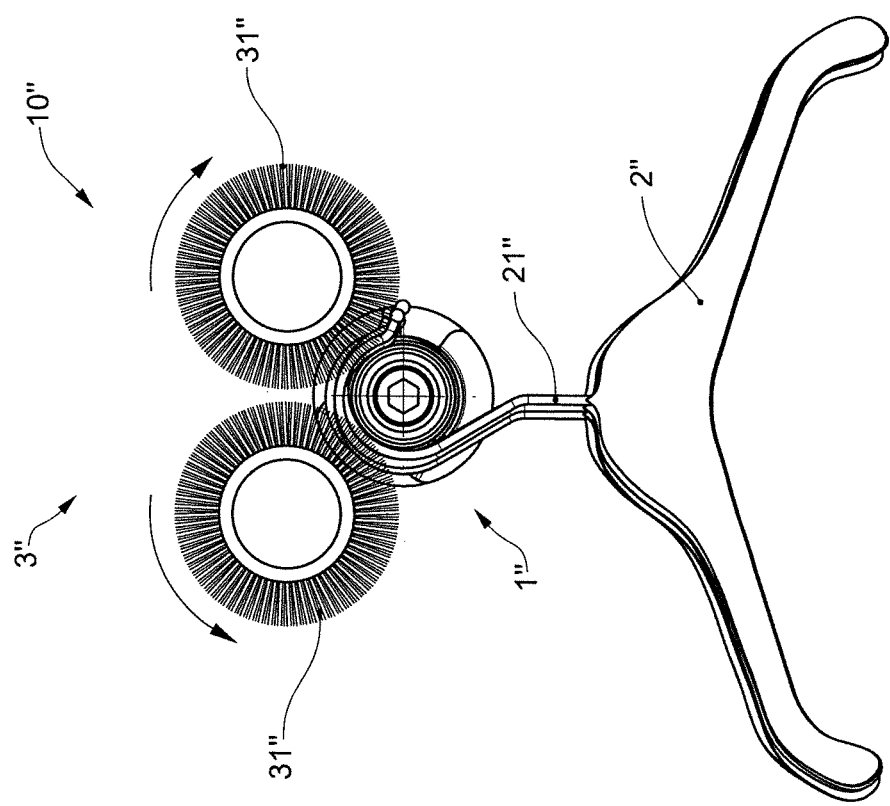
FIG. 6 shows a frontal view of a further embodiment of a conveyor having a guide apparatus.

FIG. 6 shows a frontal view of a further embodiment of a separating apparatus 10" having a guide apparatus 3". The guide apparatus 3" comprises two brushing worms 31" arranged above and parallel to the conveying cylinder 1", which are rotatable in the direction of the arrows. The brushing worms 31" can be brought into engagement with the hooks 21" on the conveying cylinder 1" and restrict a radial movement of the hooks 21". In particular, the brushing worms 31" can prevent the hooks 21" from jumping out of the conveying cylinder 1", for example due to a separating operation. Furthermore, the brushing worms 31", by engagement with the hooks 21", can push these same in the direction of conveyance.

I claim:

1. A separating apparatus (10, 10', 10") for separating crossed hooks (21a-d, 21', 21") of overhead conveyor units (2a-d, 2', 2"), the separating apparatus (10, 10, 10', 10") comprising: a conveying cylinder (1, 1', 1") having a recess (11) which forms a helical thread (12) with helix base (121) and helix flanks (122, 123) for the conveyance of the hooks (21a-d, 21', 21"), the conveying cylinder (1, 1', 1") comprising at least one wing-shaped separating element (13, 13a-d), which extends over a partial circumference of the conveying cylinder (1, 1', 1") and protrudes in a radial direction from the peripheral surface of the conveying cylinder (1, 1', 1"), wherein the separating element (13, 13a-d), by rotation of the conveying cylinder (1, 1', 1"), is insertable between two hooks (21a-d, 21', 21") resting on the conveying cylinder (1, 1', 1").

2. The separating apparatus (10, 10', 10") according to claim 1, wherein the partial circumference over which the separating element (13, 13a-d) extends is greater than or equal to one-eighth, one-sixth, one-quarter or one-third of a circumference of the conveying cylinder (1, 1', 1").

3. The separating apparatus (10, 10', 10") according to claim 1, wherein the separating element (13, 13a-d) has an inclination in the azimuthal direction.

4. The separating apparatus (10, 10', 10") according to claim 3, wherein the inclination of the separating element (13, 13a-d) matches a slope of the helical thread (12) at the separating element (13, 13a-d).

5. The separating apparatus (10, 10', 10") according to claim 3, wherein the inclination of the separating element (13) is lesser or greater than a slope of the helical thread (12) at the separating element (13).

6. The separating apparatus (10, 10', 10") according to claim 1, wherein the separating element (13, 13a, 13b, 13d) is arranged on a helix flank (122, 123).

7. The separating apparatus (10, 10', 10") according to claim 6, wherein the separating element (13, 13a, 13b, 13d) is arranged on a, in relation to the direction of conveyance (F) of the conveying cylinder (1, 1', 1"), front helix flank (123) or rear helix flank (122).

8. The separating apparatus (10, 10', 10") according to one of claim 1, wherein the separating element (13, 13c) is arranged on the helix base (121).

9. The separating apparatus (10, 10', 10") according to claim 1, wherein the separating element (13) extends from the helix base (121) to a helix flank (122, 123).

10. The separating apparatus (10, 10', 10") according to claim 1, wherein the separating element (13, 13a-d) has a profile which tapers in an azimuthal direction, which azimuthal direction preferably corresponds to a direction of rotation (R) of the conveying cylinder (1, 1', 1").

11. The separating apparatus (10, 10', 10") according to claim 1, wherein the separating element (13, 13a-d) has a profile which tapers away from the peripheral surface of the conveying cylinder (1, 1', 1") in the radial direction.

12. The separating apparatus according to claim 1, wherein the separating element protrudes in the radial direction from the peripheral surface of the conveying cylinder with a height which varies over the partial circumference, wherein preferably the height of the separating element decreases in an azimuthal direction which corresponds to a direction of rotation of the conveying cylinder.

13. The separating apparatus (10, 10', 10") according to claim 1, wherein the conveying cylinder (1, 1', 1") has at least two, three, four, six or eight separating elements (13, 13a-d).

14. The separating apparatus (10, 10', 10") according to claim 13, wherein the separating elements (13, 13a-d) are arranged offset along the longitudinal axis of the conveying cylinder (1, 1', 1"), preferably spaced apart by less than one full turn of the helical thread (12).

15. The separating apparatus (10, 10', 10") according to claim 13, wherein the separating elements (13, 13a-d) are arranged azimuthally offset.

16. The separating apparatus (10, 10', 10") according to claim 13, wherein the separating elements (13) are configured such that at least two separating elements (13) extend over differently sized partial circumferences of the peripheral surface of the conveying cylinder (1, 1', 1").

17. The separating apparatus (10, 10', 10") according to claim 13, wherein the distance between two adjacent separating elements (13, 13a-d) differs from the pitch of the helical thread (12) in the region of the separating elements (13, 13a-d).

18. The separating apparatus (10', 10") according to claim 1, wherein the separating apparatus (10', 10") has a guide apparatus (3', 3"), which is arranged on the conveying cylinder (1', 1") such that the guide apparatus (3', 3") limits a radial and/or azimuthal movement of the hooks (21', 21"), and the guide apparatus (3") is preferably configured to push the hooks (21") in the axial direction.

19. The separating apparatus (10") according to claim 18, wherein the guide apparatus (3") is configured as a brushing worm (31") arranged parallel to the conveying cylinder (1"), wherein the brushing worm (3") can be brought into engagement with hooks (21") resting on the conveying cylinder (1").

20. The separating apparatus according to claim 1, wherein on the conveying cylinder, downstream of the at least one separating element, is arranged a sensor, which is configured to detect singularized hooks.

21. A conveyor (100) having a separating apparatus (10, 10', 10") according to claim 1.

22. The conveyor according to claim 21, comprising a control system which controls the separation of the crossed hooks with the separating apparatus, wherein the control system is preferably connected to a sensor, arranged downstream of the at least one separating element, for detecting separated hooks, and controls the conveying speed of the conveying cylinder in dependence on the detection of hooks by the sensor.

* * * * *